United States Patent
Welin (10) Patent No.: US 9,981,647 B2
(45) Date of Patent: May 29, 2018

(54) DISC BRAKE AND SENSOR DEVICE FOR IT

(71) Applicant: Hans Welin, Sankt Ibb (SE)

(72) Inventor: Hans Welin, Sankt Ibb (SE)

(73) Assignee: Haldex Brake Products AB (SE)

( * ) Notice: Subject to any disclaimer, the term of this patent is extended or adjusted under 35 U.S.C. 154(b) by 0 days. days.

(21) Appl. No.: 14/464,471

(22) Filed: Aug. 20, 2014

(65) Prior Publication Data

US 2014/0353094 A1 Dec. 4, 2014

Related U.S. Application Data

(63) Continuation of application No. PCT/EP2013/053218, filed on Feb. 18, 2013.

(30) Foreign Application Priority Data

Feb. 22, 2012 (DE) .................... 20 2012 001 863 U (51) Int. Cl.
| | |
|---|---|
| *B60T 17/22* | (2006.01) |
| *F16D 66/02* | (2006.01) |
| *F16D 55/227* | (2006.01) |
| *B60T 1/06* | (2006.01) |
| *F16D 66/00* | (2006.01) |

(52) U.S. Cl.
CPC .............. *B60T 17/22* (2013.01); *B60T 1/065* (2013.01); *F16D 55/227* (2013.01); *F16D 66/021* (2013.01); *F16D 66/025* (2013.01); *F16D 66/026* (2013.01); *F16D 66/027* (2013.01); *F16D 2066/003* (2013.01)

(58) Field of Classification Search
CPC ........... F16D 55/02; B60T 17/22; B60T 1/065
USPC ........................................................ 188/18 A
See application file for complete search history.

(56) References Cited

U.S. PATENT DOCUMENTS

| | | | | | |
|---|---|---|---|---|---|
| 3,534,835 | A | * | 10/1970 | Meier ..................... | F16D 65/18 188/196 F |
| 4,819,768 | A | * | 4/1989 | Czich ..................... | F16D 65/18 188/196 D |
| 4,830,149 | A | * | 5/1989 | Giering ................. | F16D 65/567 188/196 V |
| 5,848,673 | A | * | 12/1998 | Strauss ................. | F16D 65/568 188/1.11 L |

(Continued)

FOREIGN PATENT DOCUMENTS

| | | |
|---|---|---|
| DE | 4312377 A1 | 10/1993 |
| DE | 4230831 A1 | 3/1994 |

(Continued)

OTHER PUBLICATIONS

International Search Report Application No. PCT/EP2013/053218 Completed: May 8, 2013; dated May 23, 2013 3 pages.

*Primary Examiner* — Bradley T King
*Assistant Examiner* — James K Hsiao
(74) *Attorney, Agent, or Firm* — St. Onge Steward Johnston and Reens LLC (57) ABSTRACT

A disc brake and a sensor device being applied in connection with such a disc brake. The sensor device includes a hollow shaft which cooperates with a rotary element, the rotary element is set into rotation during the adjustment movement of a corresponding adjustment device of an actuation mechanism of that disc brake, in which the rotary element includes a socket for the reception of a reset tool, which socket will always be freely accessible.

23 Claims, 7 Drawing Sheets

(56) References Cited

U.S. PATENT DOCUMENTS

| | | | | |
|---|---|---|---|---|
| 6,129,183 | A * | 10/2000 | Ward | F16D 65/183 188/1.11 L |
| 6,272,914 | B1 * | 8/2001 | Ciotti | F16D 55/22655 188/11 |
| 6,276,494 | B1 * | 8/2001 | Ward | F16D 65/183 188/1.11 L |
| 6,659,235 | B2 * | 12/2003 | Ortegren et al. | 188/73.31 |
| 6,763,918 | B1 * | 7/2004 | Kapaan et al. | 188/72.8 |
| 6,962,244 | B2 * | 11/2005 | Ortegren et al. | 188/72.7 |
| 7,322,447 | B2 * | 1/2008 | Deckhut | F16D 65/18 188/1.11 L |
| 7,484,602 | B2 * | 2/2009 | Iraschko | F16D 65/183 188/196 BA |
| 7,591,350 | B2 * | 9/2009 | Bieker et al. | 188/72.9 |
| 7,950,500 | B2 * | 5/2011 | Helf | F16D 65/183 188/1.11 L |
| 8,047,336 | B2 * | 11/2011 | Niehorster | F16D 65/54 188/1.11 L |
| 2003/0173164 | A1 * | 9/2003 | Angerfors | 188/71.7 |
| 2004/0026181 | A1 * | 2/2004 | Baumgartner et al. | 188/71.7 |
| 2008/0073161 | A1 * | 3/2008 | Pettersson | B60T 17/221 188/1.11 L |
| 2009/0090585 | A1 * | 4/2009 | Sikorski | 188/1.11 E |
| 2009/0177362 | A1 * | 7/2009 | Schmitt | F16D 66/025 701/70 |
| 2010/0065379 | A1 * | 3/2010 | Erny | B66D 5/08 187/288 |
| 2011/0254679 | A1 * | 10/2011 | Todd | B60T 17/221 340/454 |
| 2013/0068571 | A1 * | 3/2013 | Welin | 188/72.1 |
| 2013/0255366 | A1 * | 10/2013 | Seglo | B60T 7/042 73/121 |

FOREIGN PATENT DOCUMENTS

| | | |
|---|---|---|
| DE | 19923457 C1 | 11/2000 |
| DE | 102006042777 B3 | 10/2007 |
| DE | 102010011725 A1 | 9/2011 |
| EP | 0460378 A2 | 12/1991 |
| EP | 0492143 A1 | 7/1992 |
| EP | 0566066 A1 | 10/1993 |
| EP | 0567155 A1 | 10/1993 |
| EP | 0784162 A2 | 7/1997 |
| EP | 0877873 B1 | 9/2002 |
| EP | 0877872 B1 | 5/2003 |
| WO | 2004111484 A1 | 12/2004 |
| WO | 2007140985 A1 | 12/2007 |
| WO | 2011113553 A2 | 9/2011 |

* cited by examiner

DISC BRAKE AND SENSOR DEVICE FOR IT

FIELD OF THE INVENTION

The present invention relates to a disc brake and a sensor device for detecting the wear of brake linings of such a disc brake, in particular for utility vehicles.

BACKGROUND OF THE INVENTION

Sensor devices for wear detection and/or for detecting the actuation stroke of disc brakes are known with different configurations.

For example, from EP 0 492 143 it is known to sense the wear of the brake linings at the end of an adjustment spindle of the actuation mechanism, which end faces away from the brake disc, in that the rotation of that adjustment spindle, which correlates with the translatorial movement of the brake pad for compensating the wear-induced clearance, is considered as a quantity. A similar method is also described in EP 0 566 006.

DE 43 12 377 discloses a sensor device in which the displacement movement of the brake actuation mechanism in the brake caliper is detected preferably by means of a linear potentiometer.

Moreover, from EP 0 784 162 a wear monitoring device is known in which the movement of a thrust spindle is detected by means of a gearing. For that purpose, the thrust spindle comprises a gear rack which meshes with a pinion of a sensor unit.

From WO 2004/111484 of the applicant it is known to sense the movement of the thrust spindle of the actuation mechanism at the face surface of the thrust spindle facing away from the brake disc in a linear manner.

For example, DE 42 30 831 discloses a sensor unit which is arranged in a separate housing, which housing is arranged at the rear side cover of the housing of the brake caliper of a disc brake. The detection mechanism received in the housing of the sensor unit is directly connected to the rear end of the thrust spindle thereby enabling torque transmission.

Similar mechanisms which sense the rotational movement of a spindle of an adjustment mechanism are e.g. known from WO 2007/140985 or from DE 10 2006 042 777, in which the rotation of the spindle is measured by the respective sensors in a touchless manner.

Plenty of configurations according to the prior art are realized in such a way that the adjustment mechanism of the clamping mechanism comprises a possibility of connecting the wear sensor and separate therefrom a further possibility for the temporary attachment of a tool by which the adjustment mechanism can be returned during a pad change.

These both connections are configured separate from each other since for cost reasons it would not be accepted by the market if for the purpose of pad change the sensor mechanism has to be removed, since such assembly steps could damage sealing elements for sealing the interior of the brake caliper to the outside, which sealing elements exist between the sensor housing and the brake caliper and an opening provided in it for the sensor housing, respectively, whereby new sealing elements have to be installed when subsequently the sensor mechanism has to be re-mounted. Moreover, the sensor has to be exactly mounted and aligned and, if needed, calibrated again upon reinstallation.

Moreover, depending on the configuration of the brake caliper on the one hand and on the configuration of the clamping mechanism with a corresponding adjustment unit on the other hand different design and in particular mechanical and kinematical adaptations become necessary in order to be able to install the sensor devices, which in turn results in additional costs. There exist disc brakes which are configured for a later installation of a corresponding sensor unit and there exist such for which this can be realized with disproportionate high efforts only. Beside these design adaptations also different sealing elements have to be always provided in order to avoid the intrusion of dirt and water into the interior via the openings provided in the housing of the brake caliper for the sensor units, whereby the clamping mechanism and the adjustment mechanism could substantially be harmed thereby reducing the functional safety.

Diverse mechanisms for the adaptation and other adaptors for sensor unit thus have to be kept on stock as spare parts with different configurations.

SUMMARY OF THE INVENTION

Starting from the disadvantages known from the prior art as described it is an objective of the invention to provide a disc brake in which a sensor device for detecting the lining wear is utilized which is easy to mount and dismount on the one hand and which for that purpose does not present any sealing problems on the other. Furthermore, it is an objective of the invention to provide a sensor device which can be easily arranged at existing brake calipers and at clamping mechanisms and adjustment mechanisms, respectively, contained therein at a later stage. A further aspect of the invention refers to a sensor device which does not influence other assembly works at the clamping mechanism.

These objectives are solved by a disc brake and a sensor device according to the invention.

Accordingly, the invention relates to a disc brake with a brake caliper which straddles at least one brake disc, comprising a clamping and actuation mechanism, respectively, received in the housing of the brake caliper, which includes an adjustment mechanism which directly or indirectly sets at least one rotary element into rotation upon the adjustment movement, in which the rotary element comprises a mount or socket for receiving a tool for resetting the adjustment device, and a sensor device which cooperates with the rotary element, in which the sensor device comprises a hollow shaft which is in engagement with the rotary element in such a way that the mount or socket is freely accessible for receiving the tool.

For that the sensor device can cooperate with a rotary element via a through bore in the housing of the brake caliper such that the mount or socket will be just accessible from the outside via that through opening.

Thus, the quintessence of the invention is that the sensor device for the lining wear is in connection with the rotary element which is utilized for the manual reset during pad change, in which the sensor device has not to be removed or detached from the rotary element and the sensor housing has not to be detached from the brake caliper, respectively, during the process of manual resetting due to the configuration of a preferably cylindrical hollow shaft. In other words, the mount or socket of the rotary element stays accessible for a tool provided therefor anytime.

By that, the sealing existing between the housing of the brake caliper and the housing of the sensor device on the one hand and the engagement existing between the rotary element and the hollow shaft on the other will not be influenced upon reset during pad change.

According to one embodiment the spindle of the adjustment device of the actuation mechanism itself can be the rotary element with which the sensor device is in direct connection via its hollow shaft, e.g. in an axial elongation.

According to a preferred embodiment, however, this rotary element is a component separate from the adjustment spindle, which component cooperates with the spindle so that the sensor device indirectly cooperates with the spindle of the adjustment device, e.g. by means of a further rotary element in the form of a pinion in coaxial engagement.

The sensor device according to the invention in particular qualifies for the detection of the wear of a clamping mechanism as it e.g. is explained in the German Patent Application 10 2010 011 725 of the Applicant, to which disclosure herewith it is explicitly referred to.

The rotary element comprises a section for the engagement with the hollow shaft of the sensor device, which section is radially offset to the mount or socket for the reception of the reset tool, i.e. it comprises a greater inner diameter than the mount or socket.

Preferably, a splined connection or press-fit is suited as a fixation mechanism for a torque-transmitting connection between the hollow shaft and this section of the rotary element. Other coaxial latching mechanisms or rigid screw of rivet connections can possibly be used as well as material bonded connections such as e.g. by means of gluing.

The rotary element, which for example can be made as a shaft for a pinion which in turn meshes with a pinion of the adjustment device, as this is the case in the previously mentioned application, can be rotatably supported in an opening, in particular in a through opening in the housing of the brake caliper.

Preferably, the section of the rotary element being supported in the opening of the brake caliper comprises at least such a sealing arrangement that a complete sealing of the interior of the housing of the brake caliper to the outside is ensured and thereby still a rotatable support of the rotary element is enabled.

According to a preferred embodiment the housing of the sensor device is configured in such a way that it is also inserted with a section into the opening or through opening of the housing of the brake caliper from the outside, and in particular with that section in which the hollow shaft is rotatably guided in the sensor housing.

According to an advanced configuration of this embodiment, this housing section of the sensor device being inserted into the opening comprises a corresponding sealing device which seals the interior of the housing of the brake caliper to the outside, in addition to the sealing being created by the rotary element which is rotatably supported in that opening.

Basically, types of sensors can be used for the detection of the wear of the brake lining which embody different sensing principles.

Preferably, at least one Hall-sensor is utilized as a sensor element which senses the rotational movement of at least one magnet in a known manner.

A reduction gear cooperating with the hollow shaft adequately reduces the rotational movement of the hollow shaft into a corresponding turn of the magnet, which preferably does not exceed a singular 360 degree turn resembling the entire possible wear.

The housing of the sensor device can be fixed to the outside of the housing of the brake caliper by means of suitable fixation mechanisms, such as e. g. a bolted connection.

The sensor device according to the invention can be utilized both in disc brakes with sliding calipers and with fixed calipers with one or more brake discs. In principle, it is also independent from the kind of the used clamping mechanism and the adjustment device cooperating therewith.

A substantial advantage of this sensor device according to the invention can be seen in that no additional sealing elements are required for its attachment at the housing of the brake caliper on the one hand and during pad change on the other, in order to seal the interior of the brake caliper to the outside, since this sealing is already realized by the rotary element of the adjustment device being supported in the opening of the brake caliper, which preferably is configured as a reset axle. Since the connection of the sensor device with the reset axle thus is effected externally from the sealed area and thereby externally of the sealed inner space of the brake caliper housing, basically additional sealing elements are not necessary. According to a preferred embodiment further sealing elements can rather be provided in the area of the section of the sensor housing, which protrudes into the opening of the brake caliper, in which this, however, is not stringently required for a perfect sealing of the inner space of the brake caliper housing. Sealing elements which are provided in the area of the sensor housing in addition lead to an additional sealing of the connecting interface between the hollow shaft and the rotary element.

One advantage of the invention can be particularly seen in that the sensor device has not to be detached upon pad exchange for the purpose of the manual returning or reset of the adjustment device, completely independent from its configuration. This will simplify the manual reset as such since no additional disassembly steps have to be performed which in turn could result in sealing problems. Altogether, the assembly proves to be very simple since the hollow shaft of the sensor device has to be put into a torque-transmitting engagement with the rotary element of the adjustment device in axial alignment only, in that the hollow shaft will be inserted into the opening of the brake caliper in which the rotary element is rotatably supported.

The configuration of the sensor device according to the invention enables the retrofitting of already existing disc brakes at reasonably neglectable additional costs. A considerable stock of spare parts with respect thereto does not have to be provided. The sensor device according to the invention can be mounted at the disc brake in a late assembly stage and does not have to be considered already upon assembly and insertion of the clamping mechanism and/or the adjustment mechanism into the housing of the brake caliper, which further reduces the design of these components in advance and the costs associated therewith as well as the further manufacturing costs.

In the following further advantages and features of the present invention do become apparent from the embodiments as described in view of the accompanying drawings.

DETAILED DESCRIPTION OF THE INVENTION

Figure 1A:
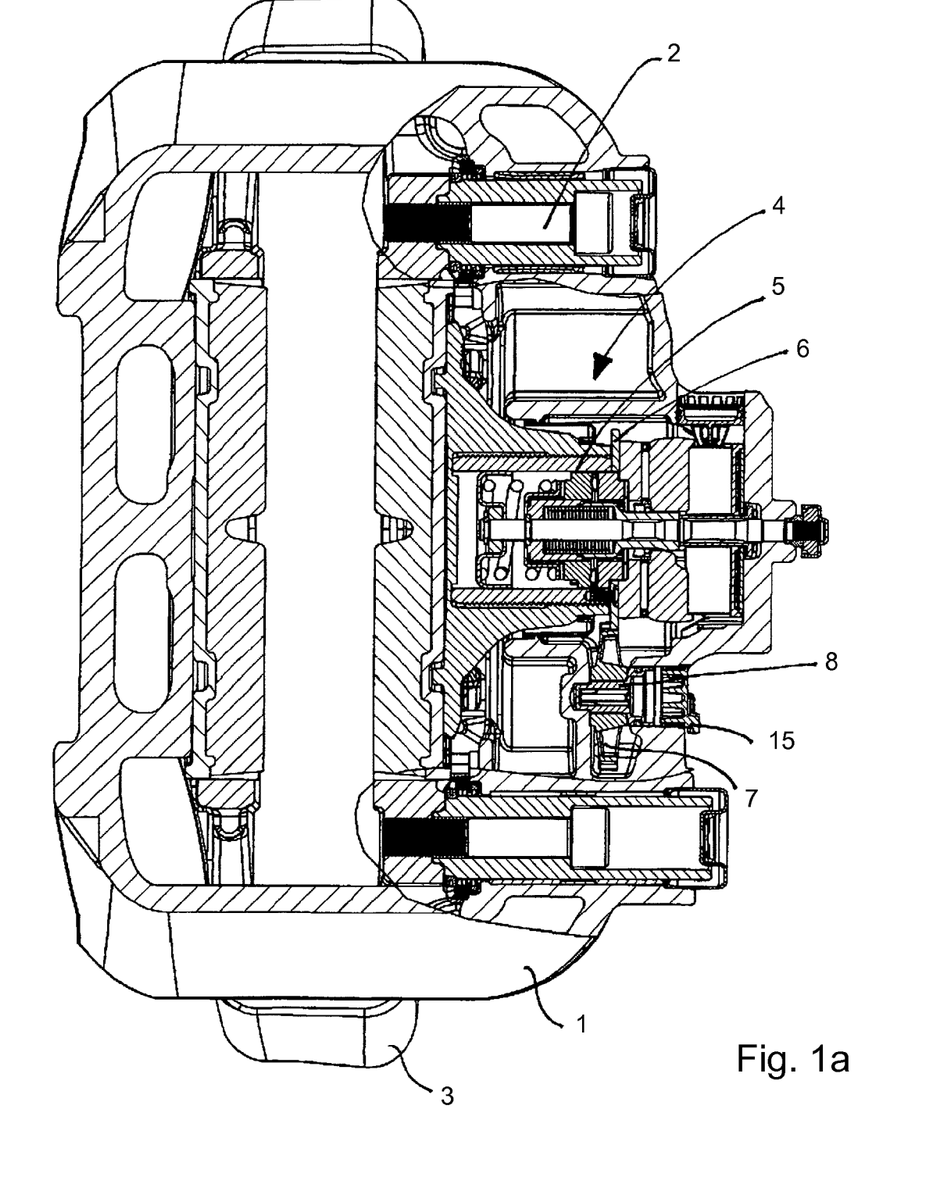
FIG. 1a is a partly cross section of a disc brake according to the prior art in which the clamping mechanism with an integrated adjustment device can be seen.

As an example, FIG. 1 shows a disc brake with a brake caliper 1 which is slideably guided on a carrier 3 by means of guides to via bolts.

A clamping mechanism 4 is arranged in the housing of the brake caliper 1 which includes an adjustment device comprising an adjustment spindle 5. For clarifying the exact functioning of the clamping mechanism with its adjustment device as shown in FIG. 1a, herewith it is expressively referred to DE 10 2010 011 725 of the applicant.

The adjustment mechanism of the clamping mechanism 4 comprises an adjustment spindle 5 which at its end facing away from the brake disc is rotatably fixedly connected with a pinion 6.

This pinion 6 meshes with a further pinion 7 in coaxial arrangement which is fixed on an axle or shaft 8.

Figure 1B:
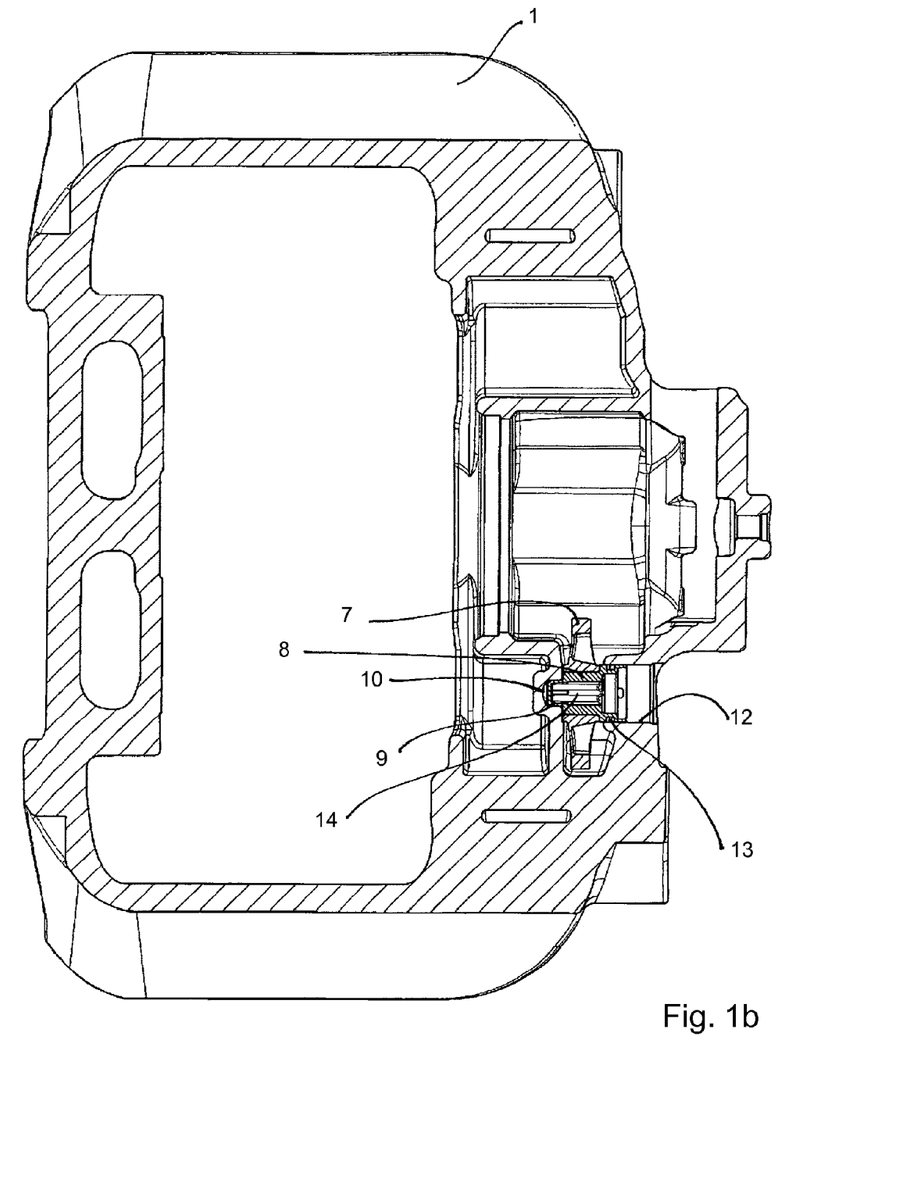
FIG. 1b is a partly cross section of the housing of the brake caliper with a pinion being supported on a rotary element which is configured as shaft.

As an additional rotary element of the adjustment device axle 8 is rotatably supported in the housing of the brake caliper 1, and in particular, as this is shown in FIG. 1b, at the side facing the brake disc with its front section 9 in a blind hole 10 of the brake caliper 1 and opposite to that with its cylindrical section 11 in an opening 12 in the housing of the brake caliper 1.

The opening 12 is configured in the housing of the brake caliper 1 as a through bore.

By means of a radial sealing element 13 being provided in the cylindrical section 11 the axle 8 seals the interior of the housing of the brake caliper 1 to the outside.

The axle 8 comprises a socket 14 for receiving a tool 31 (see FIG. 5) by means of which the adjustment device, i. e. the adjustment spindle 5 of the clamping mechanism 4 can be returned by simple rotation and in the following can be transferred into its starting position again at mounted new brake pads by rotating in the opposite direction.

In FIG. 1a the opening 12 is closed by means of a cover 15.

However, it is provided according to the invention that a sensor device 16 will be attached to the axle 8 in order to be able to detect the wear of the brake linings.

Figure 2:
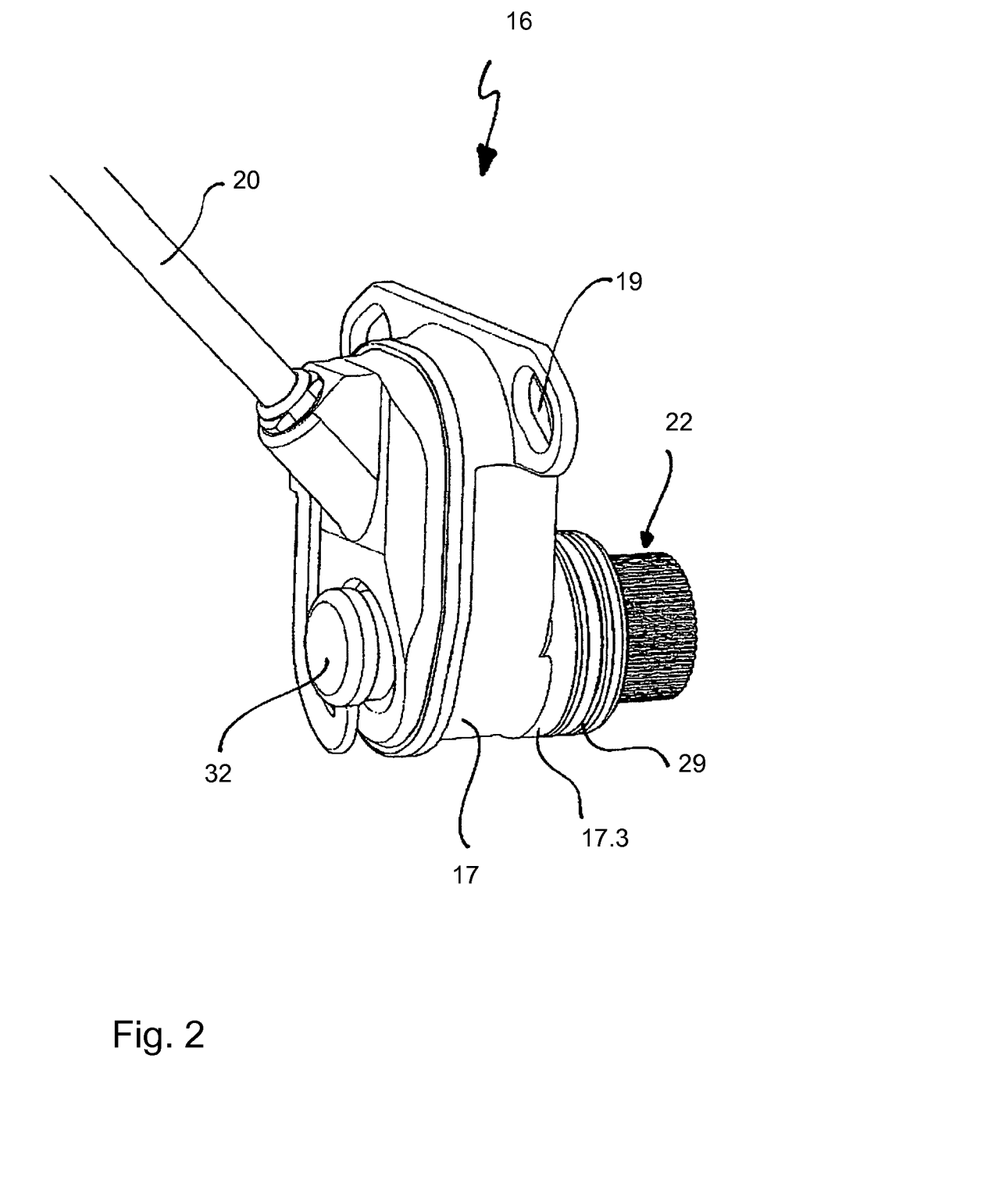
FIG. 2 is a perspective view of the sensor device according to the invention.

Such a sensor device 16 is shown in FIG. 2 in perspective view.

Figure 4:
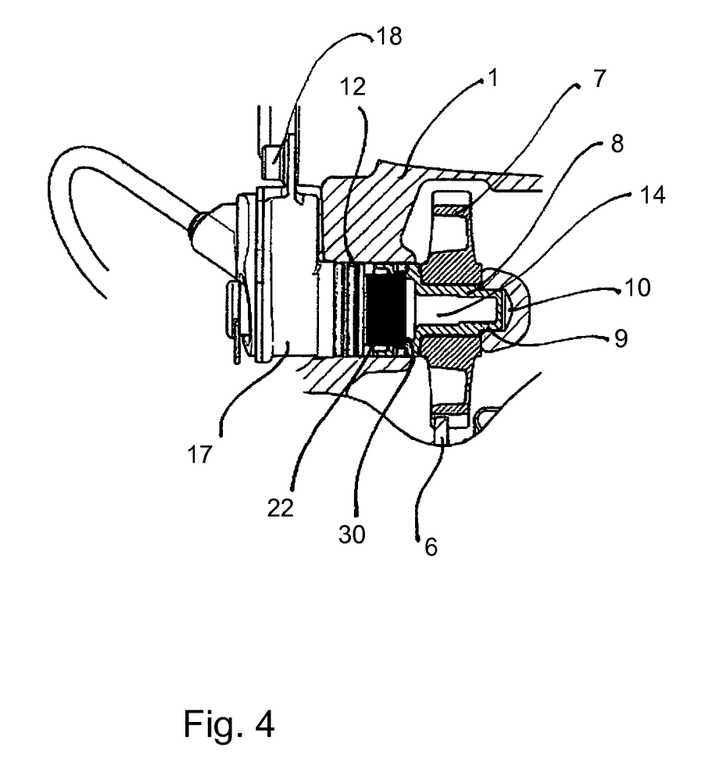
FIG. 4 is a partly cross section of the sensor device according to the invention being arranged at a rotary element of the adjustment mechanism.

The sensor device 16 comprises a housing 17 which can be, as this is for example shown in FIG. 4, fixed to the rear side at the housing of the brake caliper 1 by means of screws 18 and corresponding through bores 19.

From the housing 17 of the sensor device 16 a conduit protrudes which leads to a main wear monitoring system of the vehicle or to a warning system for the driver of the vehicle, in order to always transmit the actual wear status.

Figure 3A:
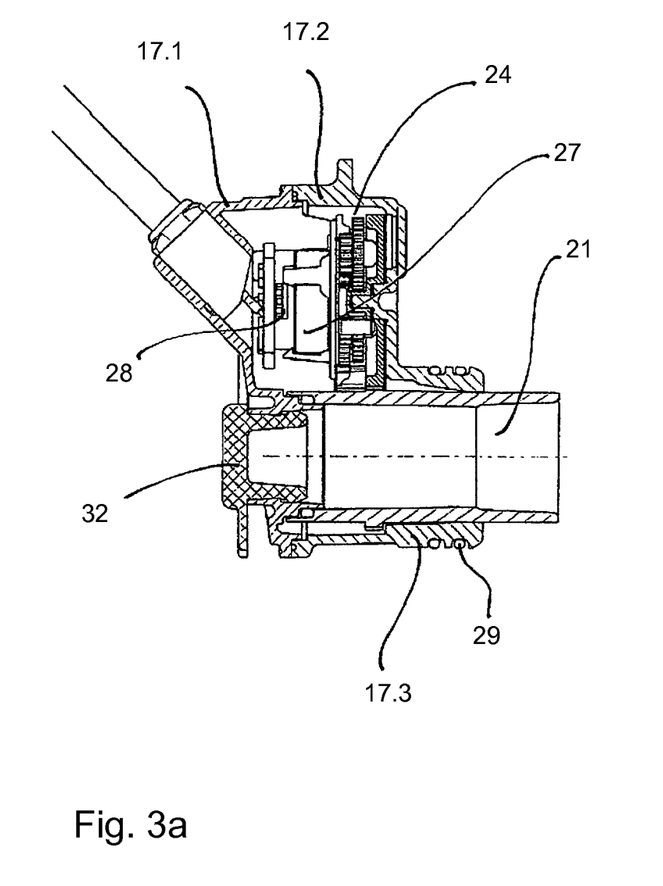
FIG. 3a is a lateral cross section of the sensor device according to the invention.
Figure 3B:
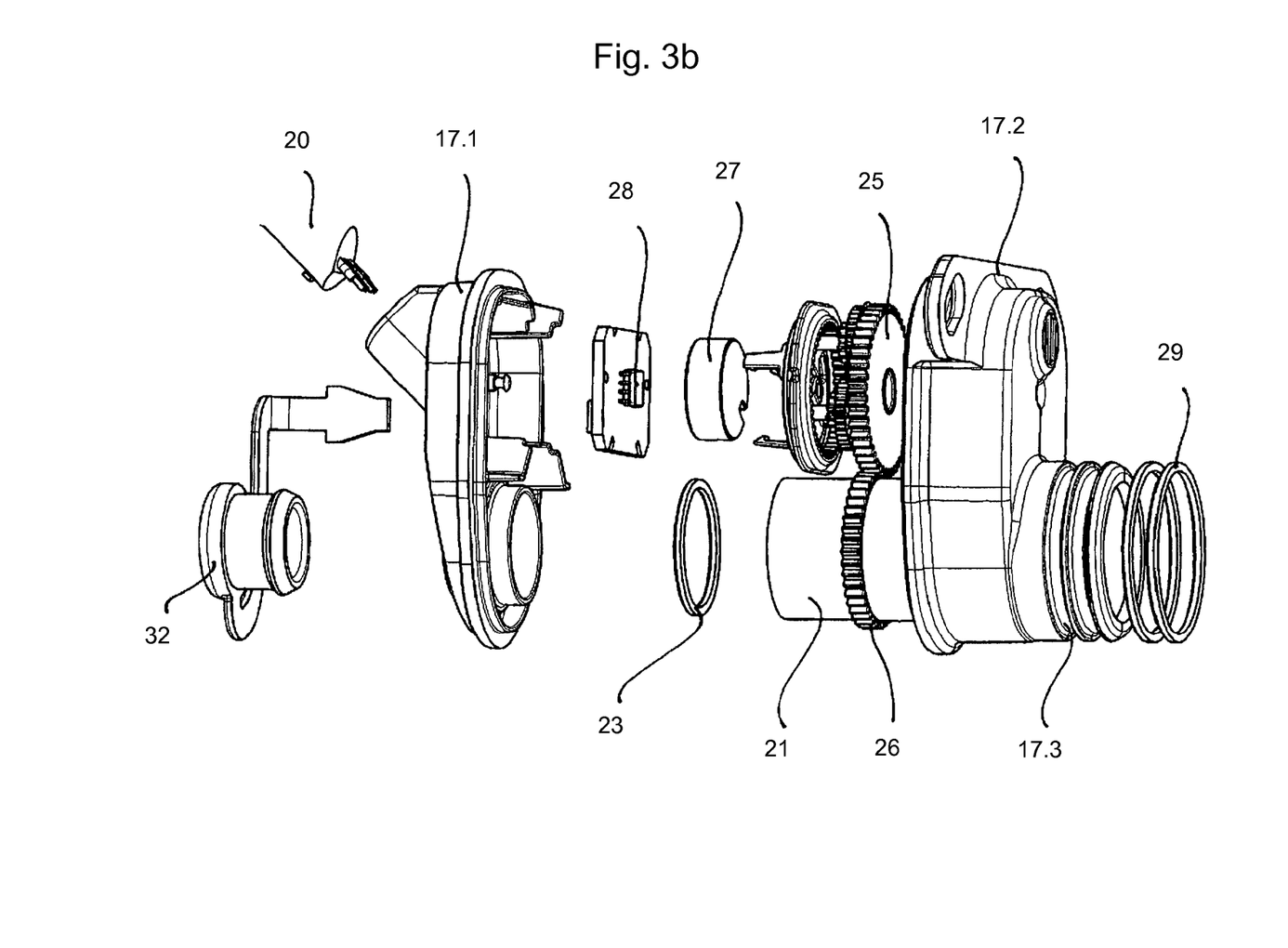
FIG. 3b is an explosive view of the sensor device according to the invention.
Figure 5:
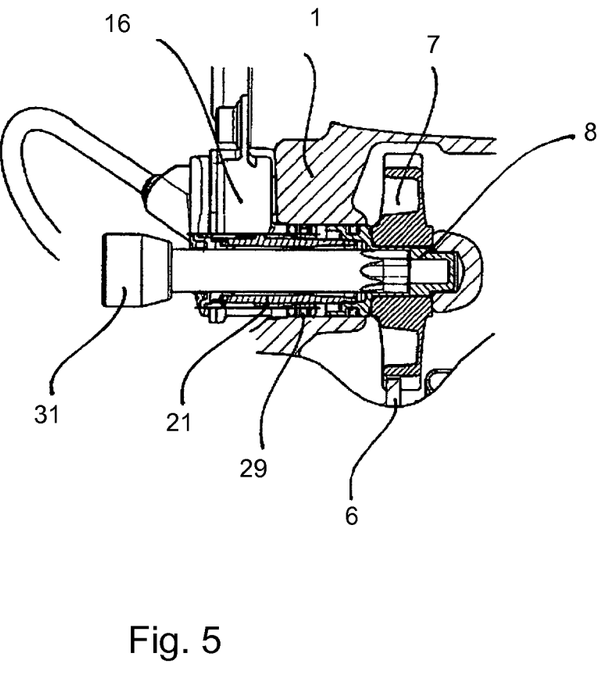
FIG. 5 is a partly cross section of the sensor device according to the invention with an inserted reset tool.

As the cross sectional views of FIGS. 3a and 3b as well as of FIG. 4 and FIG. 5 do show in detail, a hollow shaft 21 is rotatably guided in the housing 17 of the sensor device 16. The hollow shaft 21 comprises a section 22 at one end, which section 22 comprises circumferentially spaced splines and grooves in order to form a rigid, torque-transmitting splined connection with the axle 8 of the pinion 7 being in engagement with the adjustment device.

As shown in FIG. 3a, at one side the hollow shaft 21 is rotatably guided in a corresponding radial bearing of a first housing part 17.1 and at the opposite side at a corresponding cylindrical bearing of a second housing part 17.2. Upon connecting both housing parts 17.1 and 17.2 during assembly, for example by means of snap-plug-in connection the hollow shaft 21 will be rotatably fixed and positioned in the housing 17 of the sensor device 16, in which a corresponding slide bearing and/or sealing element 23 could be provided in the housing part 17.1.

A reduction gear 24, for example in the form of a planetary gear, is arranged in the housing part 17.2, which meshes by means of a pinion 24 of this reduction gear 24 with a corresponding toothing 26 of the hollow shaft 21. The reduction gear 24 transmits the rotation of the hollow shaft 21 into a corresponding reduced rotation of a rotary body 27 being rotatably supported in the housing 17 of the sensor device 16. This rotary body 27, for example, can be connected to the planetary wheel or the hollow wheel of the planetary gear and could comprise at least one magnet. Preferably, this rotary body 27 is formed as a bipolar magnet which rotates with a certain distance over a Hall-sensor 28 in a touchless manner, correspondingly.

By that, the rotation of the hollow shaft 21 can be exactly sensed, in which a corresponding processing circuit assigns the reduction of the reduction gear 24 to the actual wear of the brake linings, correspondingly.

As this is shown in FIGS. 4 and 5 the sensor device 16 is inserted with a front housing section 17.3 of the housing part 17.2 into the through opening 12 of the housing of the brake caliper 1, in which in addition two radial sealing elements 29 are provided.

With the section 17.3 being inserted into the through opening 12, the hollow shaft 21 comes into engagement with its section 22 with a corresponding section 30 of axle 8 thereby forming a splined connection.

As can be in particular seen from FIGS. 4 and 5 section 30 of axle 8 is radially offset to the outside in relation to the socket 14 of axle 8 for the purpose of engagement with the section 22 of the hollow shaft 21, so that this section 30 comprises a greater inner diameter than the socket 14, whereby always free access to the socket 14 of the axle 8 is ensured, so that for the manual reset during pad change a corresponding returning or reset tool 31 can be inserted into the socket 14 of the axle 8 passing the hollow shaft 21, as this is shown in FIG. 5.

For that purpose, it is only required that a cover 32 closing the housing part 17.1 of the sensor device 16 and thereby the hollow shaft 21 has to be removed. This means that for the purpose of returning the adjustment device it is only necessary to remove the cover 32, however, it is not necessary to separate the entire sensor device 16 from the housing of the brake caliper 1 and from the axle 8.

This is advantageous in that during a return the sealing formed by the sealing element 13 of the axle 8 in the opening 12 on the one hand and opposite thereto the sealing formed by the sealing elements 29 of the housing section 17.3 of the sensor device 16 do not have to be dissolved; in fact, the entire sealing of the interior of the housing of the brake caliper 1 being formed in such a way will always be maintained at any time, both during operation of a disc brake and during assembly and/or disassembly of the sensor device 16 as well as during a reset by means of a reset tool 31.

When compared to known sensor devices of the prior art a dismantling will not be required at any time. Moreover, existing brake mechanisms can be retrofit with such a configured sensor device 16 according to the invention at all times.

What is claimed is:

1. A disk brake with a brake caliper which overlaps at least one brake disc, comprising:
    an actuation mechanism received in a housing of the brake caliper, which includes an adjustment device that upon an adjustment movement sets at least one rotary element directly or indirectly into rotation, in which the rotary element includes a socket for receiving a tool for returning the adjustment device, the adjustment device adjusting a clearance between a brake pad and the brake disc, and
    a retrofittable pad wear sensor device connected to an exterior of said brake caliper housing such that said retrofittable pad wear sensor device is detachably connectable to said brake caliper without disassembly thereof, which retrofittable pad wear sensor device is adapted to cooperate with the rotary element for sensing the wear of the brake pads, said retrofittable pad wear sensor arranged separate from said adjustment device,
    wherein the retrofittable pad wear sensor device comprises a hollow shaft which is in engagement with the rotary element such that the socket is freely accessible for the reception of said tool, said retrofittable pad wear sensor device being connected to a main wear monitoring system of the vehicle or to a warning system for the driver.

2. The disc brake according to claim 1, in which the sensor device cooperates with the rotary element thereby passing a through opening in the housing of the brake caliper and in which the socket can be accessed via that through opening from the outside.

3. The disc brake according to claim 1, in which the rotary element comprises a section for the engagement with a hollow shaft, which is radially offset to the outside in relation to the socket for the reception of the tool.

4. The disc brake according to claim 1, in which the rotary element is rotatably supported in an opening in the housing of the brake caliper.

5. The disc brake according to claim 4, in which the rotary element is rotatably supported in the through opening.

6. The disc brake according to claim 4, in which the rotary element seals the interior of the housing of the brake caliper to the outside.

7. The disc brake according to claim 1, in which the rotary element comprises a pinion which is in engagement with a pinion of the adjustment device.

8. The disc brake according to claim 1, in which the pad wear sensor device comprises a housing, in which the hollow shaft is rotatably guided.

9. The disc brake according to claim 8, in which the housing is at least partly inserted into the opening.

10. The disc brake according to claim 9, in which the housing seals the opening to the outside.

11. The disc brake according to claim 8, in which a reduction gear is arranged in the housing, with which the hollow shaft is in engagement.

12. The disc brake according to claim 11, in which at least one sensor element is arranged in the housing, which senses the rotational movement of the reduction gear.

13. The disc brake according to claim 12, in which the at least one sensor element is a Hall-sensor.

14. The disc brake according to claim 8, in which the housing is fixed to the brake caliper.

15. The disc brake according to claim 1, wherein said rotary element being accessible for receiving a tool and functional for returning the adjustment device without the pad wear sensor device being connected to an exterior of said brake caliper housing.

16. The disc brake according to claim 1, in which the pad wear sensor device transmits an actual wear status to a wear monitoring system or to a warning system.

17. A retrofittable pad wear sensor device adapted to sense wear of a brake pad, which is compensated for by an adjustment movement of an adjustment device adapted to adjust a clearance between a brake pad and the brake disc, said adjustment device being received in a brake caliper of a disc brake, in which the adjustment device during the adjustment movement sets at least one rotary element directly or indirectly into rotation, in which the rotary element comprises a socket for receiving a tool for returning the adjustment device, said pad wear sensor device connected to an exterior of said brake caliper housing such that said retrofittable pad wear sensor device is detachably connectable to said brake caliper without disassembly thereof, wherein said retrofittable pad wear sensor device is arranged separate from said adjustment device, said retrofittable pad wear sensor device further comprises a hollow shaft which is configured in order to be in engagement with the rotary element such that the socket is freely accessible for the reception of said tool, said retrofittable pad wear sensor device being connected to a main wear monitoring system of the vehicle or to a warning system for the driver.

18. A pad wear sensor device according to claim 17, in which the hollow shaft is rotatably guided in a housing of the pad wear sensor device.

19. A pad wear sensor device according to claim 18, in which a reduction gear to be actuated by the hollow shaft and at least one sensor element cooperating with the reduction gear are arranged in the housing.

20. A pad wear sensor device according to claim 17, in which the housing is configured such that it is at least partly insertable into an opening of the brake caliper.

21. A pad wear sensor device according to claim 20, in which the housing is configured in order to seal the opening to the outside.

22. A pad wear sensor device according to claim 17, in which the housing is attached to the brake caliper.

23. A pad wear sensor device according to claim 19, wherein the sensor device transmits an actual wear status to a wear monitoring system or to a warning system.

\* \* \* \* \*